United States Patent [19]
Shernoff

[11] Patent Number: 4,536,087
[45] Date of Patent: Aug. 20, 1985

[54] DITHER COMPENSATOR FOR RING LASER GYROSCOPE

[75] Inventor: Donald Shernoff, White Plains, N.Y.

[73] Assignee: The Singer Company, Little Falls, N.J.

[21] Appl. No.: 502,370

[22] Filed: Jun. 8, 1983

[51] Int. Cl.³ .............................................. G01C 19/64
[52] U.S. Cl. ................................................... 356/350
[58] Field of Search ........................... 356/350; 372/94

[56] References Cited

U.S. PATENT DOCUMENTS

| | | | |
|---|---|---|---|
| 3,373,650 | 4/1965 | Killpatrick | 356/350 |
| 4,167,336 | 9/1979 | Ljung | 356/350 |
| 4,190,364 | 2/1980 | Ljung et al. | 356/350 |
| 4,425,040 | 1/1984 | Ljung et al. | 356/350 |
| 4,444,502 | 4/1984 | Ljung | 356/350 |

Primary Examiner—Vincent P. McGraw
Assistant Examiner—S. A. Turner
Attorney, Agent, or Firm—Thomas W. Kennedy

[57] ABSTRACT

Dither compensation in a ring laser gyroscope is effectuated by one or more retroreflective prisms or by one or more pairs of cofunctioning transparent wedges mounted to the gyroscope casing in a dither compensation plane parallel to the plane of the laser light path in the gyroscope cavity. Prisms or beam splitters reflect at least one of two counter-rotating laser beams to the dither compensation plane from the plane of the cavity. An optical sensor comprising a photodiode for detecting and analyzing the interfering laser beams can be placed in the dither compensation plane or in the plane of the gyroscope cavity.

3 Claims, 13 Drawing Figures

DITHER COMPENSATOR FOR RING LASER GYROSCOPE

BACKGROUND OF THE INVENTION

This invention relates in general to ring laser gyroscopes and more particularly to means in such a gyroscope for compensating the effects of dither on an output interference pattern produced by a pair of oppositely traveling laser beams.

Many types of ring laser gyroscopes have been developed. Typical is the apparatus disclosed in U.S. Pat. No. 3,373,650 describing a ring laser gyroscope which employs monochromatic beams of light directed by mirrors in two opposite directions in an optical cavity around a closed loop path about an axis of rotation. Turning the apparatus about the axis of rotation causes the effective path length for each beam to change and results in oscillation at different frequencies in the beams since the frequency of oscillation of a laser is dependent upon the length of the lasing path. The two waves may be combined to generate interference patterns from which a measure of the rotational rate about the axis can be obtained. As is explained in that patent, the difference in frequency between the two beams at low rotational rates is small and they tend to resonate together, or to "lock in", and to oscillate at only one frequency. Therefore, low rotation rates cannot be detected. In U.S. Pat. No. 3,373,650, a solution to this problem is provided in which the apparatus is oscillated or "dithered" to avoid lock-in of the two beams. Another structure of this kind is disclosed in U.S. Pat. No. 3,467,472 and a detailed explanation of the problem and of various proposed solutions is contained in U.S. Pat. No. 3,879,103.

A problem with the use of dither is the introduction into the gyroscope output signal of an extraneous oscillating component. The elimination of this dither induced component is accomplished in many gyroscope designs by means of retroreflectors mounted on the instrument casing or on arms extending from the center of the gyroscope block to an apex thereof. These devices are sensitive to temperature changes and mechanical distortion in the casing or arm, causing errors in the output of the gyroscope. It has also been proposed, for example, in U.S. Pat. No. 3,373,650, to use transparent wedges to compensate the effect of dither on the interference pattern produced by the counter-rotating laser beams. An object of the present invention is to provide a ring laser gyroscope with an improved means of eliminating the dither induced signal component, which is less sensitive to temperature and mechanical distortions.

SUMMARY OF THE INVENTION

In conventional ring laser gyroscopes the dither compensating optical element is mounted to the gyroscope casing proximate to an apex of the dithered gyroscope block, the element being intersected by a plane defined by the closed loop path of the counter-rotating laser beams. In a gyroscope having a dither compensating apparatus according to the present invention, the compensating element is disposed laterally with respect to the block and at a distance from the dither axis at most equal to the smallest distance between the axis and the path of the laser beams. The compensating element may take the form of a prism or a transparent wedge and the gyroscope may be provided with a pair of prisms for acting on light from respective counter-rotating laser beams. If the compensating element takes the form of a wedge, it is advantageous to have two pairs of wedges, each pair having one wedge stationary with respect to the instrument casing and the other rigid with the dithered block, the wedge pairs being disposed on opposite sides of the dither axis.

A reflective optical element is provided, in a gyroscope with an improved dither compensator according to the present invention, for guiding light from at least one of the laser beams towards the compensating element.

Because the compensating element is located close to the dither axis, distortions in the gyroscope output signal resulting from temperature changes and mechanical effects are minimized.

DETAILED DESCRIPTION

Figure 1:
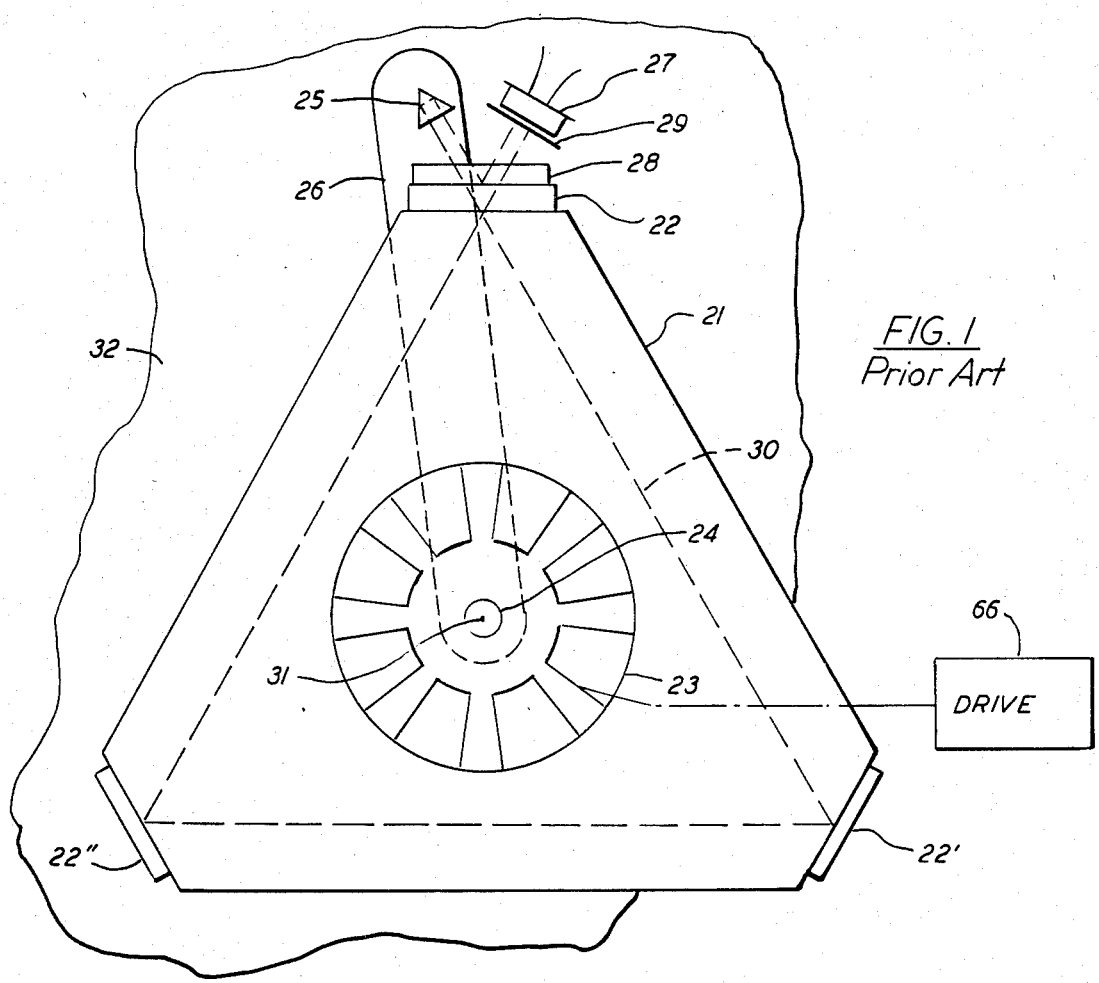
FIG. 1 is a partially schematic side view of a ring laser gyroscope block, showing a photodiode mask juxtaposed to a dual anode detector and showing a conventional dither compensation scheme.

As illustrated in FIG. 1, a conventional ring laser gyroscope comprises a dithered triangular block 21 with a triangular cavity forming a closed loop path 30, mirrors 22, 22' and 22" at the apexes of the block, a dither hinge 23, a mounting hub 24 and dither compensating element 25 in the form of a reflecting prism, a reflector arm 26, a dual anode photodiode 27, a wedge plate 28 and a photodiode mask 29. A pair of laser beams travel in opposite directions along the closed loop path 30 which encircles a dither axis 31 extending substantially perpendicularly with respect to block 21.

Block 21 is swingably mounted by means of dither hinge 23 and hub 24 to a gyroscope casing 32 which is in turn rigidly mounted to an object, such as an airplane, whose motion is to be monitored. Dither hinge 23 permits block 21 to be oscillated with respect to hub 24 (i.e. about axis 31) by a drive 66. This is done to minimize the locking together of two counter-rotating laser beams. This oscillation, if uncompensated, generates a large signal at photodiode 27, which signal interferes with the ability to take gyro readings at times within a dither period. Reflection of the laser beam from prism 25 provides compensation for the dither signal, removing most of it from the readout signal.

The rotation frequency $W_T$ of block 21 is the sum of the casing rotation frequency $W_c$ and the dither frequency $W_d$. The laser beams traveling along path 30 consist of a clockwise (CW) beam and a counterclockwise (CCW) beam. Under the assumption that frequency $W_T$ is positive for clockwise rotations, the CW beam is frequency shifted by an amount $-W_T$, while the CCW beam is shifted by $+W_T$. In FIG. 1 the CW beam passes through mirror 22 and impinges on photodiode mask 29. The CCW beam passes through mirror 22 and is reflected from dither compensating prism 25. This reflection causes a frequency shift of $2W_d$ due to the relative motion of prism 25 and block 21. The CCW beam contains a net frequency shift of $W_c-W_d$, when observed in the reference frame of block 21. The CCW beam bounces off wedge plate 28 and impinges on photodiode mask 29, where it combines with the CW beam to form an interference pattern. The motion of this pattern depends only on casing rotation frequency $W_c$.

Figure 2:
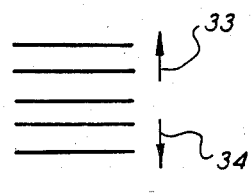
FIG. 2 is a schematic representation of an interference pattern produced by counter-rotating laser beams in the gyroscope of FIG. 1.
Figure 3:
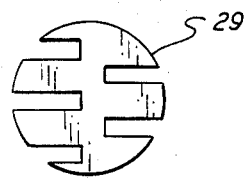
FIG. 3 is a front elevational view of the photodiode mask shown in FIG. 1.
Figure 4:
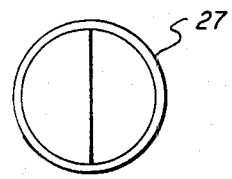
FIG. 4 is a front elevational of the photodiode detector shown in FIG. 1.

FIG. 2 is a representation of the interference fringe pattern. This is a pattern formed by two nearly parallel plane light waves combining. FIGS. 3 and 4 show some details of the photodiode mask 29 and of the face of the dual anode photodiode 27. In the absence of rotational inputs the fringe pattern is stationary. When rotation occurs, the illuminated portion of the pattern moves in the direction indicated by arrows 33 and 34. When a mask 29 such as the one shown in FIG. 3 is placed over double-anode photodiode 27 (FIGS. 1 and 4) and a moving fringe pattern impinges on the mask, each photodiode half is periodically exposed to maximum and then minimum illumination and produces electrical output signals of the ring laser gyroscope.

A simpler technique for detecting the motion of the fringe pattern involves the omission of mask 29 and a 90° rotation of photodiode 27 from the orientation shown in FIG. 4. The fringe pattern of FIG. 2 is broadened so that the fringe spacing is comparable to the spacing of the two segments of the photodiode anode. The pattern impinges directly on photodiode 27. Thus, when one anode segment is dark, the other is light, the situation periodically reversing as the fringe pattern moves.

The major difficulty in using prism 25 to compensate the effects of dither on the electrical output signal lies in the stability requirements placed upon arm 26 to which prism 25 is attached. The gyroscope output is extremely sensitive to motion of prism 25. Temperature changes and mechanical vibrations can cause motion of the prism. These considerations make reflector arm 26 a critical and expensive component. Some current designs have the prism mounted on casing 32. Such a solution, however, does not reduce the problem, but instead transfers it to the casing design.

The amount of dither compensation provided by the reflection of a laser beam from a reflector, e.g., prism 25, mounted to casing 32 or stationary with respect thereto, is proportional to the amplitude of the relative motion of the prism with respect to block 21 along the direction of the beam impinging upon the prism. The amplitude of this motion is proportional to the perpendicular distance between the impinging beam (or an extension of it) and the dither axis 31 of block 21. This means that prism 25 will produce the same amount of compensation as it does in the configuration of FIG. 1 if it is mounted at any point along the segment of path 30 extending between mirrors 22 and 22' or an extension of this path segment. In principle one could mount prism 25 at the point of nearest approach between laser beam path 30 and hub 24. The advantage of mounting it here would be that the length of the required mounting arm 26 is reduced by at least a factor of two from the length shown in FIG. 1. This can be calculated easily from the trigonometry of an equilateral triangle.

Figure 5:
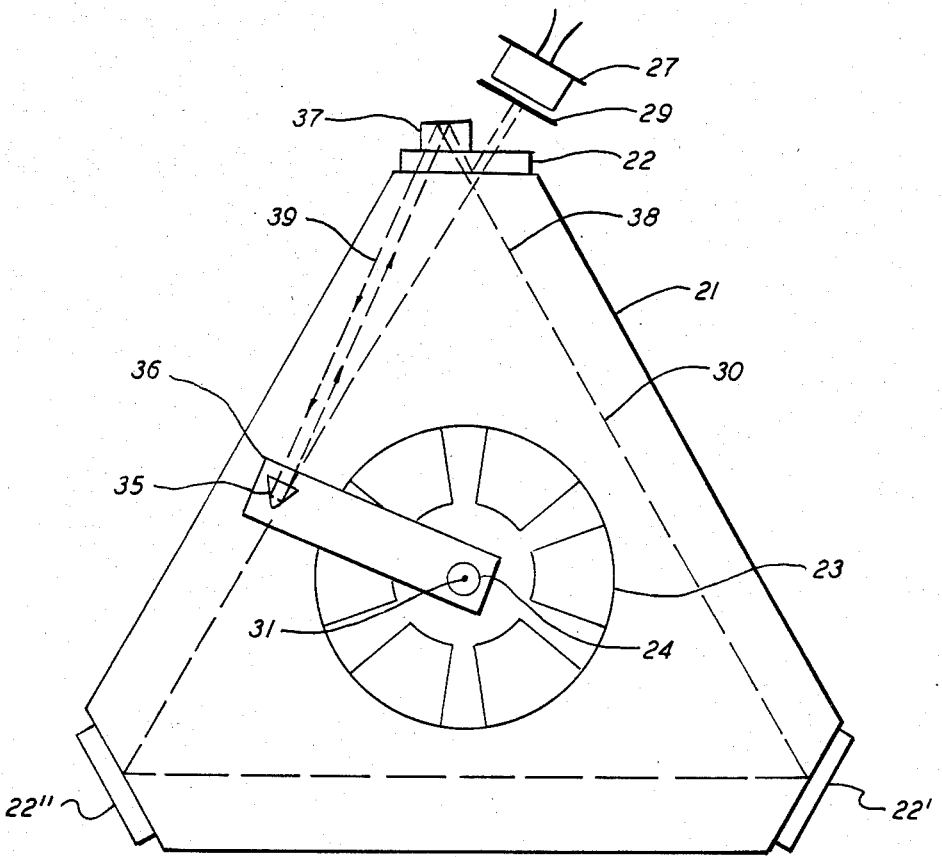
FIG. 5 is a partially schematic side view, similar to FIG. 1, of a ring laser gyroscope with an improved dither compensator according to the present invention.
Figure 6:
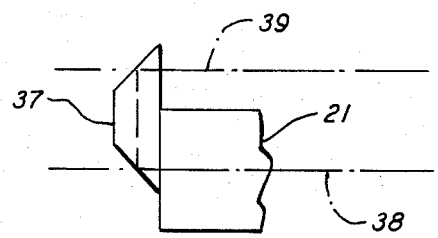
FIG. 6 is a side elevational view of a reflecting prism shown in FIG. 5.

A dither compensator 35 in the form of a passive optical element such as a prism can in fact be placed very close to this point of nearest approach by using the configuration shown in FIG. 5. Certain reference numerals of FIG. 1 are retained in FIG. 5. A reflector 37 in the shape of a prism is fastened to block 21, as illustrated in FIGS. 5 and 6. This reflector directs the laser light to retroreflector or dither compensating element 35 and directs the return beam ultimately to photodiode mask 29. In this configuration, reflector 37 may also serve the function of wedge plate 28 in FIG. 1. As illustrated in FIG. 6, reflector 37 guides laser light from a first plane 38, which contains path 30 and thus intersects gyroscope block 21, to a second plane 39 spaced therefrom and extending parallel to the first plane. Compensating element 35 is in the second plane. After reflection through element 35, the beam is reflected back to reflector 37 which returns it to plane 38 in mirror 22 which then directs it to the photodetector 27.

A configuration in accordance with the present invention as illustrated in FIG. 5 functions to provide complete dither compensation in the same manner as the conventional dither compensator arrangement shown in FIG. 1. An advantage of the configuration of FIG. 5 is that a support arm 36 having a substantially shortened length is utilized. This shortening reduces the mechanical and thermal sensitivity of the arm.

Figure 7:
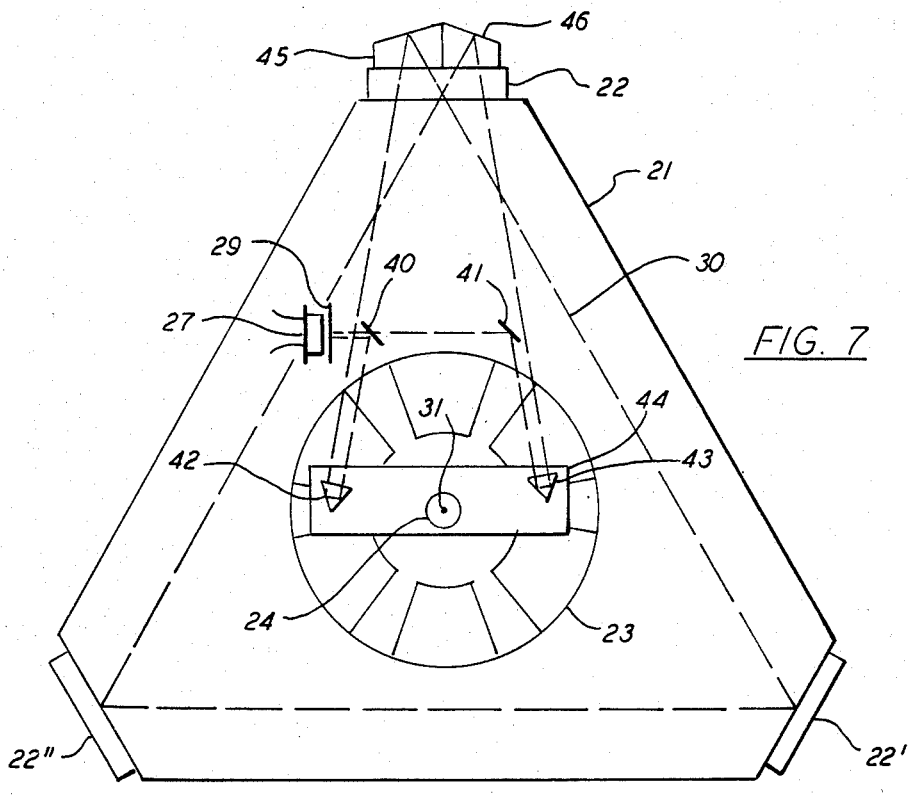
FIG. 7 is a partially schematic side view, similar to FIG. 5, of a ring laser gyroscope with a dual dither compensator according to the present invention.

A further factor of two reduction in the required arm length is possible if two compensating reflections are used, one in the CW beam and one in the CCW beam, in a configuration such as that shown in FIG. 7. In this figure the same reference numbers are used to refer to the same element. In addition to gyroscope features shown in FIGS. 1 and 5, a beam combiner 40 and a mirror 41 are illustrated in FIG. 7. In this configuration each beam is initially frequency shifted by an amount $W_T$, the sum of the casing rotation frequency $W_c$ and the dither frequency motion $W_d$. The dither compensating arrangement of FIG. 7 includes a pair of reflecting prisms 45 and 46 similar in form and deployment to prism 37 (FIG. 5) for directing the CCW beam and the CW beam, respectively, from the plane defined by path 30 to a plane spaced from block 21 and parallel to the plane of the laser beam path. Located in this spaced plane are retroreflectors 42 and 43, mirror 41, beam combiner 40, and photodetector 27. The retroreflection of the beams from reflectors in the form of prisms 42 and 43 attached to a mounting arm 44 produces a compensating frequency shift $-W_d$ in each beam as observed in the reference frame of block 21. The beams now each have a net shift proportional to only $W_c$. The CW beam after retroreflection by prism 43 is directed by mirror 41 to beam combiner 40. The beam combiner has a 50% reflecting and 50% transmitting surface. The CW beam is 50% transmitted by the combiner and impinges on photodiode mask 29. The CCW beam after retroreflection by prism 42 is 50% reflected by combiner 40 and impinges on the photodiode mask 29 where it combines with the CW beam to produce the fringe pattern shown in FIG. 2.

The configuration of FIG. 7, while requiring two retroreflectors 42 and 43 and a double arm 44, has an arm length less than one fourth that of arm 26 in FIG. 1. This is likely to provide greater mechanical and thermal stability than configuration of FIG. 5.

Figure 8:
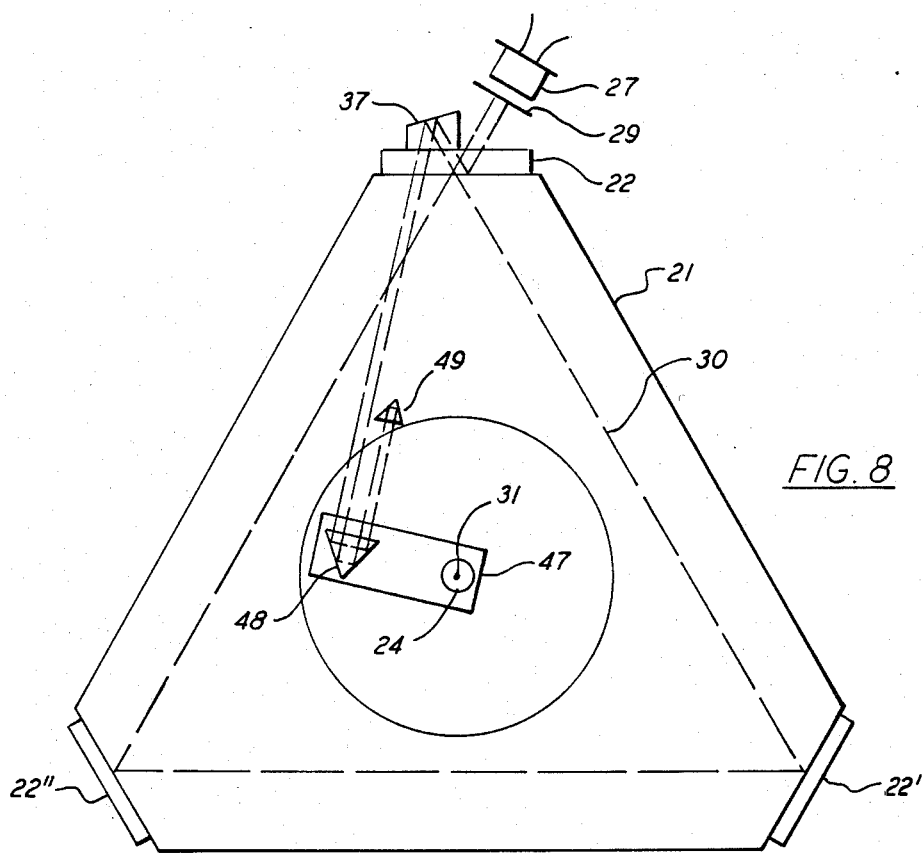
FIG. 8 is a partially schematic side view, similar to FIGS. 5 and 7, of a gyroscope having a modified dither compensator according to the present invention.

In FIG. 8 a configuration is shown in which two retroreflections occur in the CW beam. This configuration has a reflector support arm 47 with a length which is less than one fourth the length of arm 26 in FIG. 1. In FIG. 8 the CCW beam is directed by prism shaped mirror 37 (see FIGS. 3 and 6) onto a retroreflector 48 which is mounted to arm 47. The beam then strikes another retroreflector 49 which is mounted to block 21. The beam returns to retroreflector 48 and from thence to reflector 37 and is directed eventually to photodiode mask 29 in a manner similar to that described in connection with FIG. 6. This configuration illustrates how multiple retroreflection of a single beam can be used to reduce the required arm length. In this case all of the required compensation is done in the CCW beam.

Figure 9:
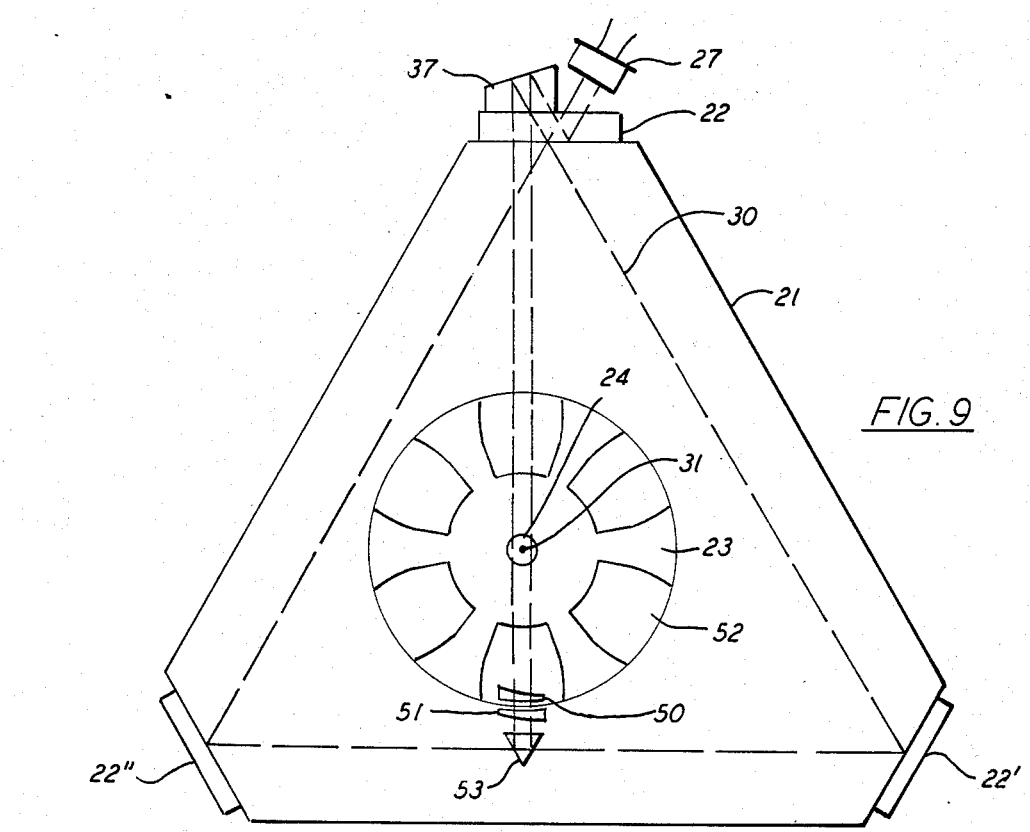
FIG. 9 is a partially schematic side view, similar to FIG. 8, of a ring laser gyroscope with a dither compensator in the form of a pair of coacting transparent wedges in accordance with the present invention.

As illustrated in FIG. 9, dither compensation may be implemented, in accordance with the present invention, by a pair of transparent wedges 50 and 51. Again, a prism-shaped mirror 37 is used to direct the CCW beam to a parallel plane containing wedges 50 and 51 and a retroreflector 53 and to direct the compensated beam back to the plane of path 30. The CCW laser beam is slowed down as it passes through the wedges both on its way to and from reflector 53, providing the mechanism for compensation of the dither motion. Wedge 50 is attached to a mounting disk 52 which is fixed to the gyroscope reference hub 24. Wedge 51 is mounted to block 21. As the gyroscope block is dithered about the hub by the dither hinge 23, the path length of the laser beam through the wedges is alternately lengthened and shortened, thereby provided a variable retardation of the beam. Upon suitable specifications of the wedge angles, the beam retardation can be made to compensate for the beam changes produced by the dithering motion.

Figure 10:
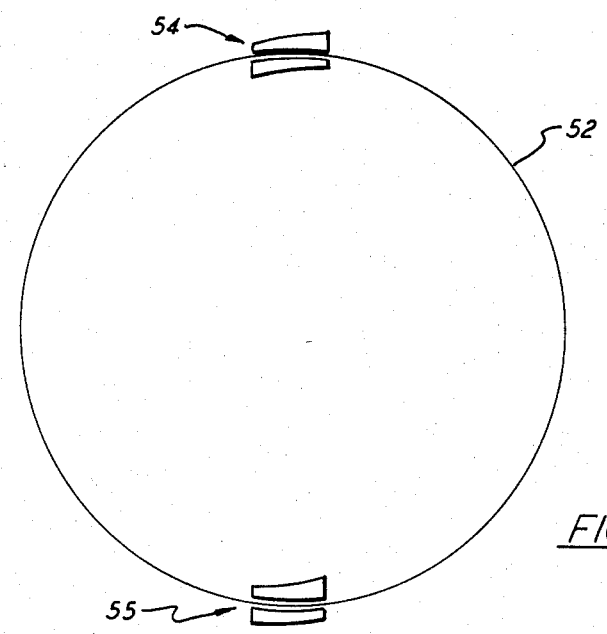
FIG. 10 is a diagram illustrating a modification of the dither compensator of FIG. 9.
Figure 11:
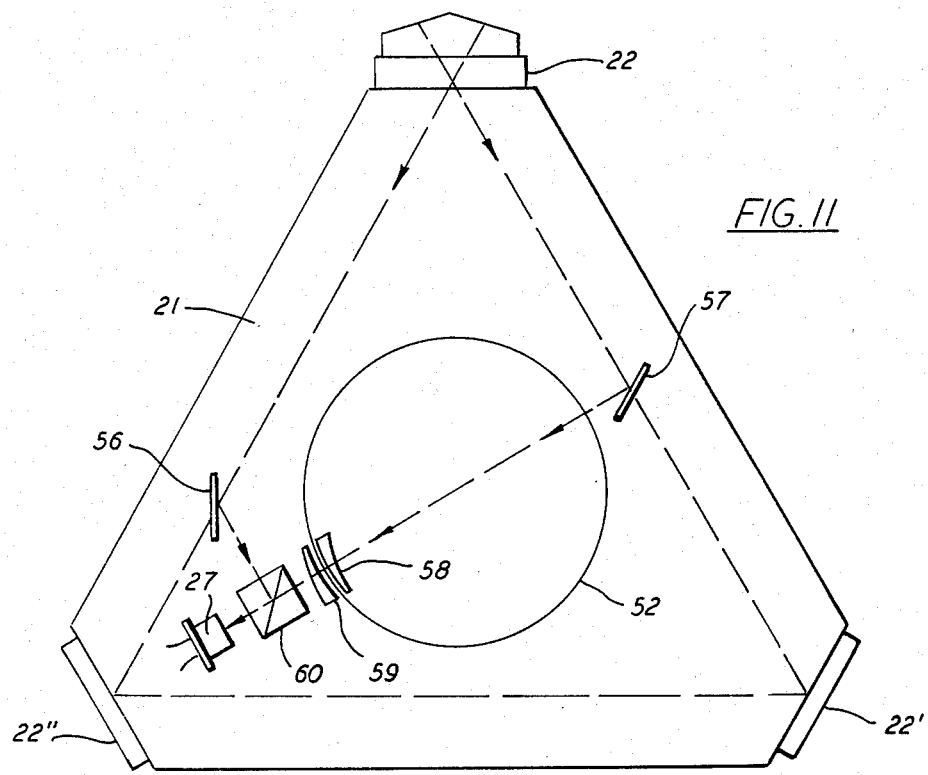
FIG. 11 is a partially schematic side view, similar to FIG. 9, of a gyroscope with yet another dither compensating arrangement in accordance with the present invention.

Many other embodiments of this basic device are possible. For example, the use of two pairs of wedges 54 and 55, as shown in FIG. 10, reduces the required wedge angle for each piece. Another variation is shown in FIG. 11. An advantage of its embodiment is that the reflector 53 of FIG. 9, a costly item, is eliminated.

In this embodiment the two counter-rotating laser beams are reflected into a parallel plane containing wedges 58 and 59, a beam combiner 60 and photodiode 27 from a pair of mirrors or beam splitters 56 and 57. One beam is compensated by wedges 58 and 59 and the two beams are combined by beam combiner 60. The combined beams impinge on photodetector 27. All components are mounted to block 21 except for wedge 58, which is mounted to disk 52 (FIG. 9) in the reference frame of the gyroscope casing 32 (see FIG. 1).

One advantage of the embodiments of FIGS. 9, 10 and 11 over current practice is that the sensitivity of the dither compensation to mechanical vibrations and distortion is greatly reduced. Beam tilt can be caused only by tilting wedge 50 or 58, because all other components are fastened to block 21. The motion of these wedges is small since they are mounted near the center hub of the gyroscope. Beam tilt sensitivity is also much less for a transmitted beam than for a simply reflected beam, where the beam tilt is equal to twice the tilt of the reflecting surface.

Figure 12:
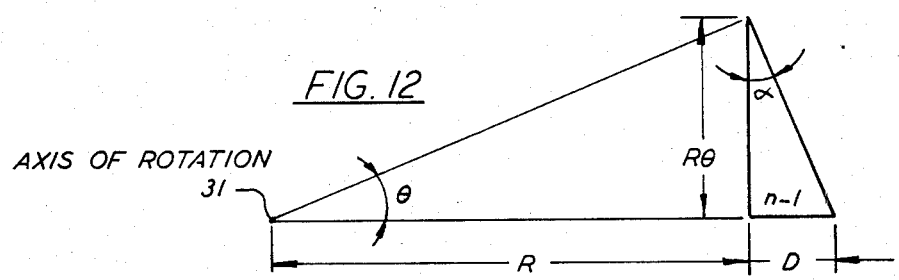
FIG. 12 is a diagram showing parameters in the calculation of an angle for a dither compensating element in the form of a wedge.

Wedges 51 and 59 (FIGS. 9 and 11) coact with wedges 50 and 58, respectively, to compensate the effects of dither on the output signal of a ring laser gyroscope. The wedges may be considered to have a right angle form for purposes of calculating an angle $\alpha$ (see FIG. 12) which completely specifies the shape of each member of a wedge pair, wedges 51 and 59 being congruent to wedges 50 and 58, respectively. A method for calculating wedge angle $\alpha$ will now be described with reference to FIG. 12. The time delay of light of wavelength $\lambda$ traversing matter having a thickness D and an index of refraction n is $D(n-1)/c$, where parameter c is the speed of light in a vacuum. The change in thickness d of a wedge pair (e.g., 50 and 51) during a dither cycle having a dither amplitude $\theta$ is $(R)(\theta) \tan \alpha$, where parameter R is the distance of the wedge pair from the dither axis. Distance R is, in FIGS. 9 and 11, the radius of mounting disk 52.

If the dither motion produces y pulses per arc sec, the change in thickness d must delay the wave by y periods in order to effect compensation. Thus, given that the period T to the wave in a vacuum is $\lambda/c$, then:

$$\frac{t}{T} = y = \frac{D(n-1)}{\lambda} \quad (1)$$

where parameter t is the time delay of light produced by the wedge thickness D.

Upon simplification and rearrangement of terms in the above equation, the following equation is derived:

$$\tan \alpha = \frac{y(\lambda)}{R(\theta)(n-1)}. \quad (2)$$

If the dither amplitude $\theta$ is 100 arc seconds (or $5 \times 10^{-4}$ radians), the dither motion producing 47 pulses per arc sec (100/2.12), and if wavelength $\lambda$ and distance R have values of $6.3 \times 10^{-5}$ cm and 3.0 cm, respectively, the wedge angle formula for a single pair of wedges traversed a single time by a gyroscope laser beam takes the form:

$$\tan \alpha = 2/(n-1). \quad (3)$$

As heretofore described with reference to FIGS. 9 and 10, a dither compensating arrangement in accordance with the present invention may comprise a wedge pair traversed twice by the same laser beam, or 2 pairs of wedges traversed once by a beam.

Figure 13:
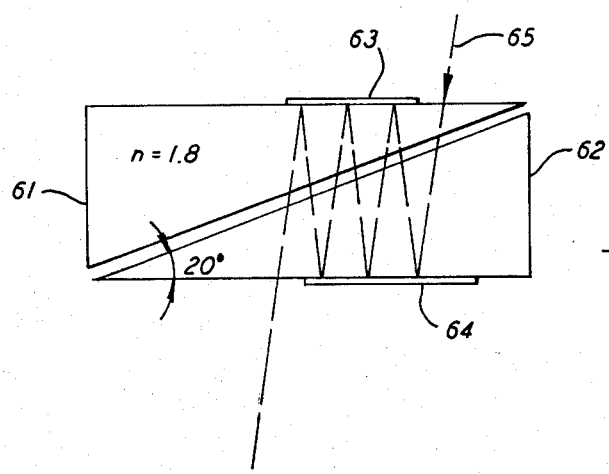
FIG. 13 is a side view of a pair of wedges with mirror surfaces in accordance with the present invention.

It is also within the scope of the present invention to insert wedges in the paths of both the CW and the CCW beam. As illustrated in FIG. 13, a pair of wedges 61 and 62 may be provided with respective mirror surfaces or coatings 63 and 64 for eliciting multiple traversals of the wedges by a light beam 65 prior to the exiting thereof. Any of these options reduces the required wedge angle $\alpha$ in accordance with the equation:

$$\tan \alpha = \frac{y(\lambda)}{M(R)(\theta)(n-1)} \quad (4)$$

where parameter M is the number of times a laser beam passes through a wedge mounted on hub 24 (see FIG. 1), e.g., via disc 52 (see FIGS. 9, 10 and 11), whether the traversals are due to internal reflection, as illustrated in FIG. 13, or to a multiplicity of wedges.

Where the gyroscope parameters take on the values presumed in the derivation of equation (3), equation (4) takes the form:

$$\tan \alpha = 2/[M(n-1)] \quad (5)$$

Values of wedge angle $\alpha$ for indexes of refraction of 1.5 and 1.8 are listed in Tables 1 and 2 for different values of parameter M, equation (5) having been used in the calculations.

TABLE 1

| n | M | α |
|---|---|---|
| 1.5 | 1 | 76° |
|  | 2 | 63 |
|  | 3 | 53 |
|  | 4 | 45 |
|  | 5 | 39 |
|  | 6 | 34 |
|  | 7 | 30 |
|  | 8 | 27 |
|  | 9 | 24 |
|  | 10 | 22 |
|  | 11 | 20 |
|  | 12 | 18 |
|  | 13 | 17 |

TABLE 2

| n | M | α |
|---|---|---|
| 1.8 | 1 | 68° |
|  | 2 | 51 |
|  | 3 | 40 |
|  | 4 | 32 |
|  | 5 | 27 |
|  | 6 | 23 |
|  | 7 | 20 |
|  | 8 | 17 |
|  | 9 | 16 |
|  | 10 | 14 |
|  | 11 | 13 |
|  | 12 | 12 |
|  | 13 | 11 |

What is claimed is:

1. In a ring laser gyroscope having an instrument casing, a gyroscope block swingably mounted to said casing, oscillating means for dithering said block with respect to said casing and about an axis of rotation, and optical sensing means attached to said casing for detecting and analyzing an interference pattern produced by a pair of laser beams traveling in opposite directions along a closed loop path lying in a first plane in said block, improved dither compensation means comprising:
   (a) a passive optical element rigidly coupled at least in part to the casing and lying in a second plane parallel to the first plane;
   (b) first means for directing at least one beam of the pair of laser beams to said passive optical element; and
   (c) second means for directing said one beam to the optical sensing means upon passage of said one beam through said passive optical element,
   wherein said passive optical element is disposed at a distance from the axis of rotation at most equal to the smallest distance between said axis and the closed loop path, and
   wherein said passive optical element comprises at least one pair of juxtaposed wedges transparent to the light of said laser beams, one of said wedges being fixed to said casing and another wedge being rigidly attached to said block.

2. The dither compensation means defined in claim 1 wherein said passive optical element includes an additional pair of juxtaposed wedges, said additional pair including one wedge fixed to said casing and another wedge attached to said block.

3. The dither compensation means defined in claim 1 wherein each wedge of said pair or juxtaposed wedges is provided with a mirror surface on a side opposite the other wedge of the pair, said mirror surfaces being positioned to cause multiple traversals of said wedges by said one beam.

* * * * *